P. ZEIHER.
NUT-LOCK.

No. 184,945. Patented Nov. 28, 1876.

Witnesses:
F. W. Howard
Edwin James

Inventor:
Peter Zeiher
per J. E. & J. Holmead
Attorney.

UNITED STATES PATENT OFFICE.

PETER ZEIHER, OF CLIFTON, WEST VIRGINIA, ASSIGNOR OF TWO-THIRDS HIS RIGHT TO WILLIAM D. ROSS AND A. A. HOLLAND, OF SAME PLACE.

IMPROVEMENT IN NUT-LOCKS.

Specification forming part of Letters Patent No. 184,945, dated November 28, 1876; application filed August 29, 1876.

*To all whom it may concern:*

Be it known that I, PETER ZEIHER, of Clifton, in the county of Mason and State of West Virginia, have invented an Improved Nut-Lock, of which the following is a full, clear, and exact description, reference being had to the accompanying drawing, and the letters of reference marked thereon, making part of this specification, in which—

Figure 1:
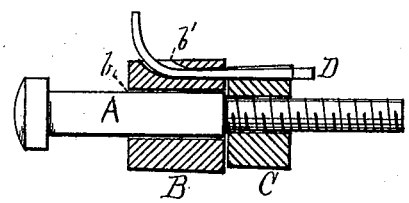
Figure 2:
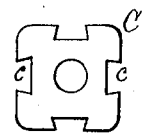
Figure 3:
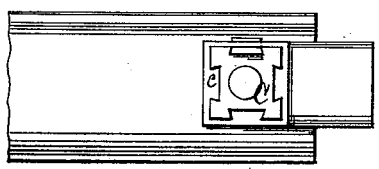
Figure 4:
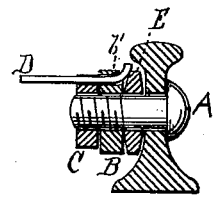

Figure 1 is a longitudinal sectional view of my improved nut-lock when applied to a common screw. Fig. 2 is a top-plan view of the nut. Fig. 3 is a top-plan view of the nut-lock when applied to a car-rail. Fig. 4 is a vertical sectional view of the device applied as illustrated in Fig. 3.

The object of my invention is the construction of a nut-lock that shall be simple and effective in operation.

The nature of my invention consists in constructing the nut with a recess in each of its four sides, and providing the washer with a slot, by means of which, in connection with the recess and a key, the nut is securely held in position, and the nut and washer prevented from turning on the bolt, as more fully hereinafter described.

The construction and operation of my invention are as follows: A is the bolt, which is constructed in the usual manner. B is the washer, made of any suitable material, and having a circular hole, $b$, in its center, through which passes the bolt A. $b'$ is an oblong slot, which enters one end of the washer B between the hole $b$ and its side, and has its other opening in the side of the washer and near its other end, said slot being curved at its lower section, as shown in Figs. 1 and 4. C is the nut, which is formed in the usual manner, with the exception that each side is provided with a recess, $c$. These recesses are formed with their sides tapering from the outer edge of the recess to its base, as shown in Figs. 2 and 3. D is the key, which is constructed out of any suitable material, and is similar in form to a horseshoe-nail. E is the fish-plate, constructed in the usual manner.

The operation is as follows: The washer B is first put on the bolt, when the nut is placed on top of the washer, the slot $b'$ being caused to register with one of the recesses $c$. The key D is then inserted in the slot $b'$ and driven until the head of the key is secured in the recess $c$. This causes its other end, by reason of the curve of the slot $b'$, when it comes in contact with the fish-plates or other obstruction, to bend, as shown in Fig. 4, and thus securely lock the nut in position.

The bearing of the flat key D on the fish-plate E prevents both the nut B and washer C from turning on the bolt A.

What I claim as new, and desire to secure by Letters Patent of the United States, is—

1. The nut C, constructed with recesses $c$, having tapering sides, substantially as described.

2. The nut C, provided with recesses $c$, washer B, provided with slot $b'$, bolt A, and key D, the whole constructed and arranged to operate substantially as described.

3. The nut C, provided with recesses $c$, washer B, provided with slot $b'$, bolt A, key D, and fish-plate E, the whole constructed and arranged to operate substantially as described.

In testimony whereof I have signed my name to this specification in the presence of two subscribing witnesses.

PETER ZEIHER.

Witnesses:
MARY M. DOWNING,
P. H. WINTERSTEEN.